(12) United States Patent
Hurt

(10) Patent No.: US 6,918,240 B2
(45) Date of Patent: Jul. 19, 2005

(54) PUSH RAKE

(75) Inventor: Daniel P. Hurt, Edina, MN (US)

(73) Assignee: Legacy Holdings, Inc., Watertown, MN (US)

( * ) Notice: Subject to any disclaimer, the term of this patent is extended or adjusted under 35 U.S.C. 154(b) by 0 days.

(21) Appl. No.: 10/455,836

(22) Filed: Jun. 6, 2003

(65) Prior Publication Data

US 2004/0187470 A1 Sep. 30, 2004

Related U.S. Application Data

(60) Provisional application No. 60/387,232, filed on Jun. 7, 2002.

(51) Int. Cl.$^7$ .................................................. A01F 7/04
(52) U.S. Cl. .................................. 56/400.19; 56/400.04
(58) Field of Search ..................... 56/400.01, 400.04, 56/400.18, 400.19

(56) References Cited

U.S. PATENT DOCUMENTS

| | | | | |
|---|---|---|---|---|
| 1,629,041 A | * | 5/1927 | Minier | 403/120 |
| 1,832,358 A | * | 11/1931 | Bruck | 56/400.11 |
| 2,481,442 A | * | 9/1949 | Paul | 56/400.17 |
| 2,536,607 A | * | 1/1951 | Jenkins | 56/400.17 |
| 2,811,823 A | * | 11/1957 | Berglund | 56/400.2 |
| 4,635,429 A | * | 1/1987 | Cornelius | 56/400.18 |
| 4,704,758 A | * | 11/1987 | Hoffman | 15/144.4 |
| 4,791,780 A | * | 12/1988 | Phillips | 56/400.04 |
| 5,467,590 A | * | 11/1995 | Mencarelli et al. | 56/400.17 |
| 6,170,112 B1 | * | 1/2001 | Mayfield et al. | 15/159.1 |
| 2003/0188523 A1 | * | 10/2003 | Geremia | 56/400.01 |

* cited by examiner

Primary Examiner—Meredith C. Petravick
(74) Attorney, Agent, or Firm—Haugen Law Firm PLLP

(57) ABSTRACT

A rake device including an elongated stem having a main portion and a first end portion adjacent thereto, with the first end portion having a first end and being configured such that a first angle defined between the first end and the main portion is acute. The rake device further includes a rake head secured to the first end portion of the elongated stem, with the rake head being generally disposed in a first plane, such that the first plane and the main portion define an acute angle therebetween.

10 Claims, 3 Drawing Sheets

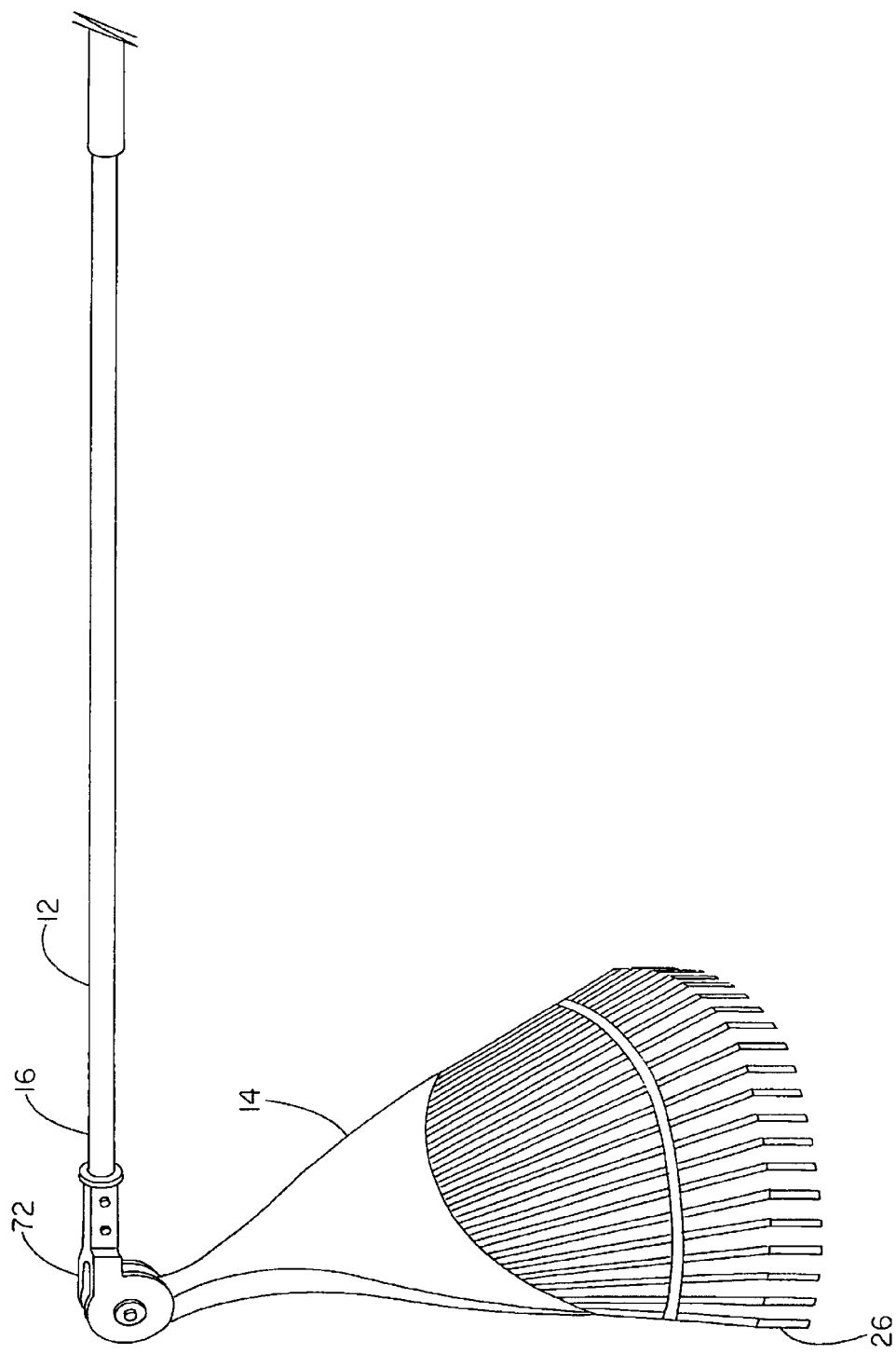

PUSH RAKE

CROSS-REFERENCE TO RELATED APPLICATIONS

This application claims priority from Provisional Application Ser. No. 60/387,232, filed Jun. 7, 2002, the contents of which are herein incorporated in their entirety.

FIELD OF THE INVENTION

The present invention relates to yard rakes generally, and more particularly to an improved yard rake having a configuration adapted to be operably pushed rather than pulled.

BACKGROUND OF THE INVENTION

A variety of hand rake configurations have been proposed and implemented to date incorporating various designs and materials. Such hand rakes are typically utilized in yards to rake leaves, grass clippings, and the like. Recent rake designs have focused on assisting the user in maintaining a comfortable and substantially upright stance during the raking process. In addition, such designs have striven to maximize the development of force in the raking stroke by altering the shape of the handle. However, conventional yard rakes require a "pulling" motion for effective raking, and typically have a fixed dispositional relationship between the rake head and the stem. Such configurations fail to optimize user comfort, fail to be adaptable to users of various size, and fail to effectively provide a mechanism for the user to perform the raking process through a "pushing" motion. A preferred pushing mode of operation of the devices of the present invention enhance the transmission of force from the user to the raking surface, such that the user expends less energy to obtain a sufficient raking force on the yard rake.

It is therefore a principal object of the present invention to provide a yard rake device that maximizes user comfort and transmission of energy to the raking surface.

It is a further object of the present invention to provide a yard rake device having a stem that is specifically configured for providing an effective raking capability as the user pushes the yard rake away from their body.

It is another object of the present invention to provide a yard rake having a stem that is selectively positionable into a variety of configurations.

It is a still further object of the present invention to provide a yard rake device having a stem which includes two or more distinct handles that are each specifically configured for maximum comfort for the user during the raking process.

It is yet a further object of the present invention to provide a yard rake device having a pivot means operably connecting the rake head to the stem, such that the rake head may selectively pivoted about an axis defined by such pivot means.

It is another object of the present invention to provide a yard rake that is capable of compacting to a relatively small size.

SUMMARY OF THE INVENTION

By means of the present invention, a rake device is provided for operable raking by a user through a pushing motion. In such a manner, the user of the rake device of the present invention performs a raking function by operably directing the rake device away from their body. The configuration of the rake device of the present invention, which specifically enables such operable motion thereof, enhances the transmission of forces from the user to the rake device, and provides for an increased degree of comfort for the user during the raking process.

In addition, the present invention provides for adjustability in the stem, as well as in the angular relationship between the rake head and the stem. Such adjustability characteristics assist in providing a highly adaptable characteristic of the present invention for enhancing the comfort and effectiveness in use.

Preferably, the rake device of the present invention includes an elongated stem having a main portion and a first end portion adjacent thereto, with the first end portion having a first end and being configured such that an angle defined between the first end portion and the main portion is acute. In addition, the rake device includes a rake head secured to the first end portion of the elongated stem, with the rake head being generally disposed in a first plane, the first plane and the main portion defining an acute angle therebetween.

In some embodiments of the present invention, the rake device includes two or more distinct stem pieces interconnected with one another, which interconnection may be a telescoping relationship and/or a pivoting relationship therebetween.

Another embodiment of the rake device of the present invention includes an elongated stem having a main portion and a first end portion, a rake head, and a pivot connector operably coupling the rake head to the first end portion of the elongated stem, with the pivot connector being configured so as to operably provide relative pivoting motion between the rake head and the elongated stem.

BRIEF DESCRIPTION OF THE DRAWINGS

FIG. 3 is a side elevational view of a rake device embodiment of the present invention.

DETAILED DESCRIPTION OF THE PREFERRED EMBODIMENTS

The objects and advantages enumerated above together with other objects, features, and advances represented by the present invention will now be presented in terms of detailed embodiments described with reference to the attached drawing figures which are intended to be representative of various possible configurations of the invention. Other embodiments and aspects of the invention are recognized as being within the grasp of those having ordinary skill in the art.

Figure 1:
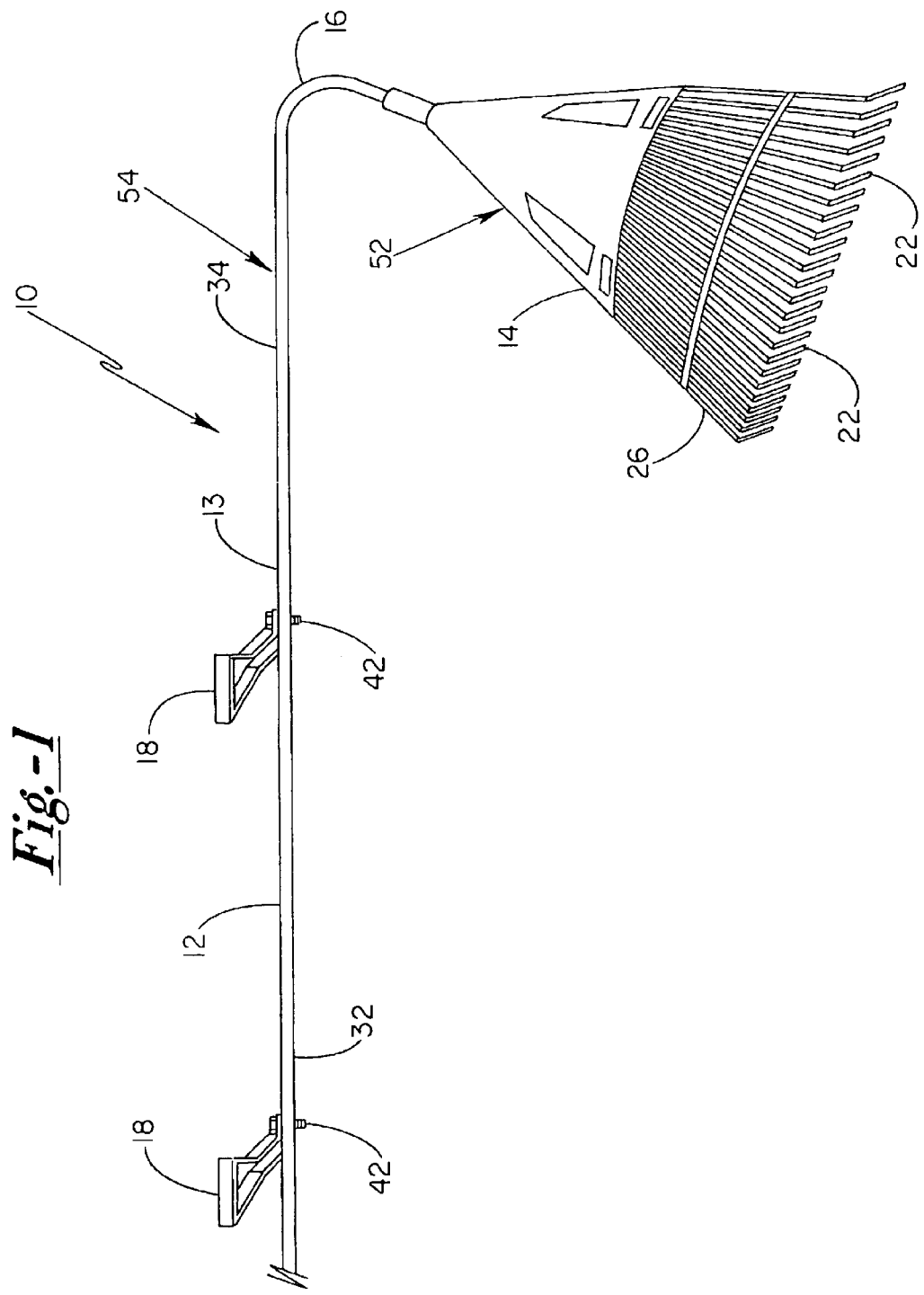
FIG. 1 is a side elevational view of a rake device embodiment of the present invention.

Referring now by characters with reference to the drawings, and first to FIG. 1, a push rake 10 is shown including an elongated stem 12, a rake head 14 secured to a first end portion 16 of stem 12, and a plurality of handles 18 selectively positioned along stem 12. First end portion 16 of stem 12 is preferably configured to form an acute angle with respect to a main portion 13 of stem 12. Rake head 14 is positionably secured on the first end portion 16 such that respective rake tine ends 22 are directed substantially away from stem 12. In such a manner, a raking operation is performed by pushing on stem 12, rather than the pulling action associated with conventional rake devices.

In preferred embodiments of the present invention, first end portion 16 of stem 12 is arcuately curved between about 110–160° from stem 12. Such an arcuate curvature of first end portion 16 is preferably configured with no offset from a plane defined vertically through stem 12. In other embodiments, however, first end portion 16 is curved or bent at an oblique angle with respect to stem 12, such that rake head 14 is offset from stem 12. The present invention contemplates a variety of relative configurations between stem 12 and rake head 14 coupled via first end portion 16, with the configurational commonality being the acute angle between rake head 14 and stem 12. For example, stem 12 may be curved or offset from first end portion 16, such that the stance of a user does not interfere with the operation of rake head 14.

In other embodiments of the present invention, first end portion 16 of stem 12 may be angled, rather than being arcuately curved, as illustrated in FIG. 1. Such an angle, however, still achieves the over-arching goal of the embodiment illustrated in FIG. 1, in that an acute angle is formed between rake head 14 and main portion 13 of stem 12.

Stem 12 is preferably configured so as to be mateable with a conventional rake head 14. Therefore, presently-produced rake heads may be secured to first end portion 16 in a conventional manner. Stem 12 is preferably fabricated from a relatively light-weight and durable material, such as wood or durable polymeric materials. Stem 12 may also be fabricated from a variety of other materials which are durable and light-weight.

Stem 12 is preferably a single unitary structure, though several alternative configurations are contemplated by the present invention. For example, stem 12 may comprise two or more sections secured to one another, either telescopingly, or otherwise. A particular example of such an embodiment provides for a distinct distal stem section 32 being telescopingly secured within proximal stem section 34. In such a manner, the overall length of stem 12 may be preferably selectively adjusted by the user. In particular, proximal stem section 34 may include a plurality of spaced apertures disposed along a portion thereof, which apertures are configured to selectively receive a protrusion disposed on distal section 32, whereby selective mating of the protrusion with a respective aperture in proximal section 34 results in the selective adjustability of the length of stem 12. A variety of other conventional selective locking means are contemplated by the present invention to provide a means for selectively adjusting the overall length of stem 12.

Such selectability is desired for push rake 12 adaptability to users of various size. For example, a smaller user may wish to operate push rake 10 with a relatively shorter stem 12. The selective adjustability means described above is useful for such a purpose. In addition, such stem length selectability provides for a compactability and portability characteristic of rake 10, so that rake 10 may be conveniently stored and transported.

In one embodiment of the present invention, handles 18 are distinct pieces which are removably attachable to stem 12 via fasteners 42 extending through respective apertures in stem 12. In such a manner, respective positioning of handles 18 is selectively accomplished, in that a plurality of apertures are provided in stem 12 that are configured to receive fasteners 42 for selectively securing respective handles 18 thereat. Handles 18 are preferably conventional for ease of assembly and cost-effectiveness.

The present invention contemplates a variety of configurations for handles 18, though distinct units of conventional design are most preferred. Handles 18 are preferably positioned for comfort and for maximum leverage by variously-sized users. In a particular embodiment of the invention, handles 18 may comprise curved or bent portions of distinct stem pieces secured to one another by fastening means. Such distinct stem pieces are preferably adjusted in their relative positions, wherein a plurality of apertures are disposed in respective distinct stem portions, thereby providing selective locations for relative engagement therebetween. In some embodiments, such distinct stem pieces may be pivotally secured to one another, such that selective angled relationship between such distinct stem pieces may be achieved. In such an embodiment, distal section 32 may preferably be angled upwardly with respect to proximal section 34 of stem 12. Therefore, relatively tall users are able to comfortably operate push rake 10.

Figure 2:
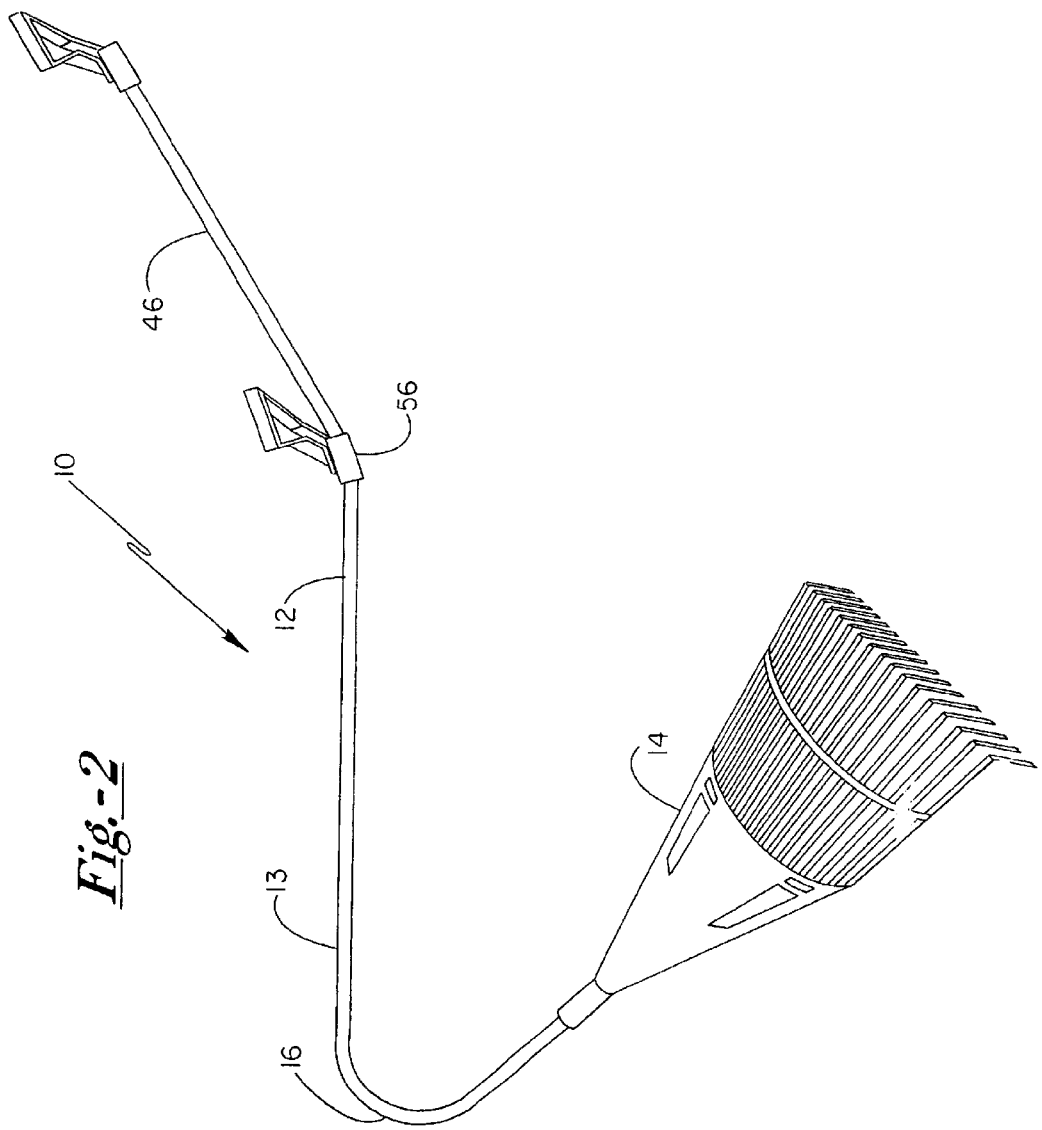
FIG. 2 is a side elevational view of a rake device embodiment of the present invention.

As illustrated in FIG. 2, stem 12 includes a second end portion 46 opposite first end portion 16, and wherein the second end portion 46 is angled with respect to main portion 13 of stem 12. Such angled second end portion 46 is preferably provided to assist in obtaining leverage on rake 10, and particularly on rake head 14, as well as for enhancing the comfort of the user during the raking process. As described above, stem 12 may include a pivot point 56 at which second end portion 46 may pivot with respect to main portion 13 of stem 12. Such a pivot point 56 provides adjustability to stem 12, so that rake 10 is adaptable to users of various size.

In a particular embodiment of the present invention, and as illustrated in FIG. 3, rake 10 includes a pivot joint 72 for providing relative pivotal motion between rake head 14 and stem 12. Such a pivot joint 72 provides a pivot means for operably coupling rake head 14 to first end portion 16 of stem 12. Preferably, pivot means 72 includes selective locking means for selectively locking rake head 14 in a desired position relative to stem 12. Preferably, pivot means 72 is configured such that rake head 14 may pivot up to substantially 360° about an axis of rotation defined by pivot means 72. Such pivotable adjustability between rake head 14 and stem 12 provides a desired degree of adaptability to users of various height, as well as to various raking applications. In most applications, the relative position between rake head 14 and stem 12 forms an acute angle therebetween, and most particularly an acute angle of between about 20° and about 80°.

Pivot means 72 may also be utilized to rotate rake head 14 to a position beyond an acute angle relationship between rake head 14 and stem 12. In some embodiments, rake head 14 may be rotatably secured to first end portion 16, such that when rake head 14 is extended beyond an acute angled relationship with stem 12, push rake 10 may be used in a "conventional" or pull-rake manner.

As illustrated in FIGS. 1–3, rake head 14 preferably includes a plurality of tine members 26 extending at least partially in a plane defined by rake head 14. Preferably, rake tine ends 22 extend outwardly from the plane defined by rake head 14 in a direction away from main portion 13 of stem 12. In other embodiments, however, rake tine ends 22 divergently extend outwardly from the plane defined by rake head 14, such that tine ends 22 extend both toward and away from main portion 13 of stem 12.

Push rake 10 of the present invention introduces a number of advantages over the prior art. For example, the vectors created in the push rake operation are typically more aligned with the arms of the user than those generated in the use of conventional rakes, thereby increasing efficiency of force transmitted from the arms of the user to rake head 14. Such efficiency results in enhanced comfort for the user during use of push rake 10.

Furthermore, the various adjustability features of the push rake of the present invention further enhances user comfort and raking efficiency. Push rake 10 of the present invention preferably comprises a number of conventional items for cost effectiveness of the push rake.

The invention has been described herein in considerable detail in order to comply with the patent statutes, and to provide those skilled in the art with the information needed to apply the novel principles and to construct and use embodiments of the invention as required. However, it is to be understood that the invention can be carried out by specifically different devices and that various modifications can be accomplished without departing from the scope of the invention itself.

What is claimed is:

1. A rake device, comprising:
   (a) an elongated stem having a main portion and a first end portion;
   (b) a rake head having a plurality of tines arranged substantially along a first plane that is operably transversely aligned with respect to a user of said rake device, said rake head defining a face on a first side of said first plane for engaging a raking surface; and
   (c) a pivot means operably coupling said rake head to said first end portion of said elongated stem and defining a first pivot axis that is oriented transversely to a longitudinal axis of said elongated stem so as to operably provide relative pivoting motion between said rake head and said elongated stem in a direction substantially perpendicular to said first plane, said pivot means including selective locking means for selectively locking said rake head in one of a plurality of pivot positions about said first pivot axis, with said plurality of pivot positions being located at least throughout 270° of arcuate travel about said first pivot axis from a first position about said pivot axis wherein a first acute angle is formed between said elongate stem and a second side of said first plane to a second position wherein a second acute angle is formed between said elongate stem and said first side of said first plane.

2. A rake device as in claim 1 wherein said plurality of tines include end portions extending out from said first plane in at least one direction therefrom.

3. A rake device as in claim 2 wherein said end portions of said tines divergently extend out from said first plane.

4. A rake device as in claim 1, including one or more handles disposed on said elongated stem.

5. A rake device as in claim 4 wherein a first of said handles is disposed at a second end portion of said elongated stem opposite said first end portion thereof, and a second of said handles is disposed at said main portion of said elongated stem between said first and second end portions.

6. A rake device as in claim 5, including handle spacing adjustment means for selectively positioning respective said one or more handles along said elongated stem.

7. A rake device as in claim 1 wherein said elongated stem includes two or more distinct stem pieces.

8. A rake device as in claim 7 wherein said stem pieces are telescopingly received in one another.

9. A rake device as in claim 7 wherein a first stem piece is pivotably secured to second stem piece.

10. A rake device as in claim 1 wherein a second end portion of said elongated stem opposite said first end portion thereof is angled with respect to said main portion.

* * * * *